(12) United States Patent
Parzynski, Jr. et al.

(10) Patent No.: US 11,459,736 B2
(45) Date of Patent: Oct. 4, 2022

(54) CUTTING EDGE

(71) Applicant: Caterpillar Inc., Peoria, IL (US)

(72) Inventors: David B. Parzynski, Jr., Peoria, IL (US); Thomas M. Congdon, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 241 days.

(21) Appl. No.: 16/828,718

(22) Filed: Mar. 24, 2020

(65) Prior Publication Data

US 2021/0301503 A1    Sep. 30, 2021

(51) Int. Cl.
*E02F 9/28* (2006.01)
*E02F 3/815* (2006.01)
*A01B 15/08* (2006.01)

(52) U.S. Cl.
CPC ............ *E02F 9/2883* (2013.01); *A01B 15/08* (2013.01); *E02F 3/8152* (2013.01); *E02F 9/2816* (2013.01); *E02F 9/285* (2013.01)

(58) Field of Classification Search
CPC .............................. E02F 3/8152; E02F 9/2883
See application file for complete search history.

(56) References Cited

U.S. PATENT DOCUMENTS

| | | | | |
|---|---|---|---|---|
| 4,129,952 A * | 12/1978 | Olson | ................ | B23K 31/025 228/170 |
| 4,187,626 A * | 2/1980 | Greer | ................ | E02F 9/285 172/747 |
| 4,211,508 A * | 7/1980 | Dill | ................ | B23P 15/28 175/426 |
| 4,315,375 A * | 2/1982 | Shinn | ................ | E02F 3/401 172/719 |
| 4,500,766 A * | 2/1985 | Reinhardt | ................ | B23K 11/00 172/719 |
| 4,715,450 A * | 12/1987 | Hallissy | ................ | E02F 3/8152 172/701.3 |
| 4,770,253 A * | 9/1988 | Hallissy | ................ | E02F 9/285 172/701.3 |
| 4,883,129 A | 11/1989 | Lonn et al. | | |
| 5,813,474 A * | 9/1998 | Manway | ................ | A01B 15/06 172/701.3 |
| 6,003,617 A | 12/1999 | McSweeney | | |
| 6,571,493 B2 | 6/2003 | Amano et al. | | |
| 6,854,527 B2 | 2/2005 | Baldwin et al. | | |
| 7,665,234 B2 | 2/2010 | Diehl et al. | | |
| 7,836,615 B2 * | 11/2010 | Winter | ................ | E01H 5/066 37/270 |
| 7,874,085 B1 * | 1/2011 | Winter | ................ | E02F 3/8157 37/270 |
| 8,241,761 B2 * | 8/2012 | Garber | ................ | B02C 2/005 428/684 |
| 9,163,379 B2 * | 10/2015 | Winter | ................ | C22C 38/04 |
| 9,995,021 B2 * | 6/2018 | Serrurier | ................ | E02F 9/2883 |
| 10,184,226 B2 | 1/2019 | Parzynski, Jr. et al. | | |

\* cited by examiner

*Primary Examiner* — Gary S Hartmann
(74) *Attorney, Agent, or Firm* — Procopio, Cory, Hargreaves & Savitch LLP

(57) ABSTRACT

A cutting edge for a machine. The cutting edge includes a top side and a bottom side opposite the top side. The cutting edge includes insert apertures along the bottom side. The insert apertures shaped to receive inserts made of harder material than the majority of the cutting edge.

18 Claims, 4 Drawing Sheets

CUTTING EDGE

TECHNICAL FIELD

The present disclosure generally pertains to ground engaging machines. More particularly this disclosure is directed toward a cutting edge for a motor grader.

BACKGROUND

Earth moving equipment such as scrapers, dozers, dragline buckets, backhoes, shovel dippers, motor graders, and the like are generally provided with a cutting component which is adapted to engage and displace earth. Because the main digging unit, for example a moldboard, is relatively expensive, it is desirable to provide a replaceable cutting component so that the cutting component main digging unit can be maintained relatively sharp without having to rework the entire bucket. The cutting component can be subject to intense abrasive wear from loads that cause high stress to the cutting component.

U.S. Pat. No. 6,854,527 to Manway et. al. describes carbide edge snowplow and grader blades that are durable and fracture resistant. The carbide along the blade edge and blade bottom which contacts the surface being treated is designed to limit the degree of fracture of the carbide. Carbide inserts along the edge and/or bottom are separated from each other by a steel alloy spacer/shim along the width of the blade. The spacer/shim reduces the potential for impact damage cracks that form in a carbide insert from propagating into adjacent inserts along the width of the blade. In one embodiment, the improved blade edge comprises an edge body having a lower edge with a recess and separate slot in the bottom surface of the edge. Within the blade recess and blade slot are positioned carbide block/bar inserts separated by spacer means made from a ductile material.

The present disclosure is directed toward improvements in the art.

SUMMARY

A cutting edge for a ground engaging machine is disclosed herein. The cutting edge includes a top side and a bottom side opposite the top side. The cutting edge further includes a front side extending between the top side and the bottom side and a back side opposite the front side. The back side extends between the top side and the bottom side. The cutting edge further includes a first side extending between the top side and the bottom side and extending between the front side and back side and a second side opposite the first side. The second side extends between the top side and bottom side and extending between the front side and back side. The cutting edge further includes a plurality of insert apertures along the bottom side. The plurality of insert apertures arranged as at least two rows extending from adjacent the first side to adjacent the second side. A first row of the plurality of insert apertures is spaced less than the diameter of one of the plurality of insert apertures from a second row of the plurality of insert apertures. The plurality of insert apertures spaced from the front side, the back side, the first side, and the second side.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Furthermore, some of the features and surfaces have been left out or exaggerated for clarity and ease of explanation.

Figure 1:
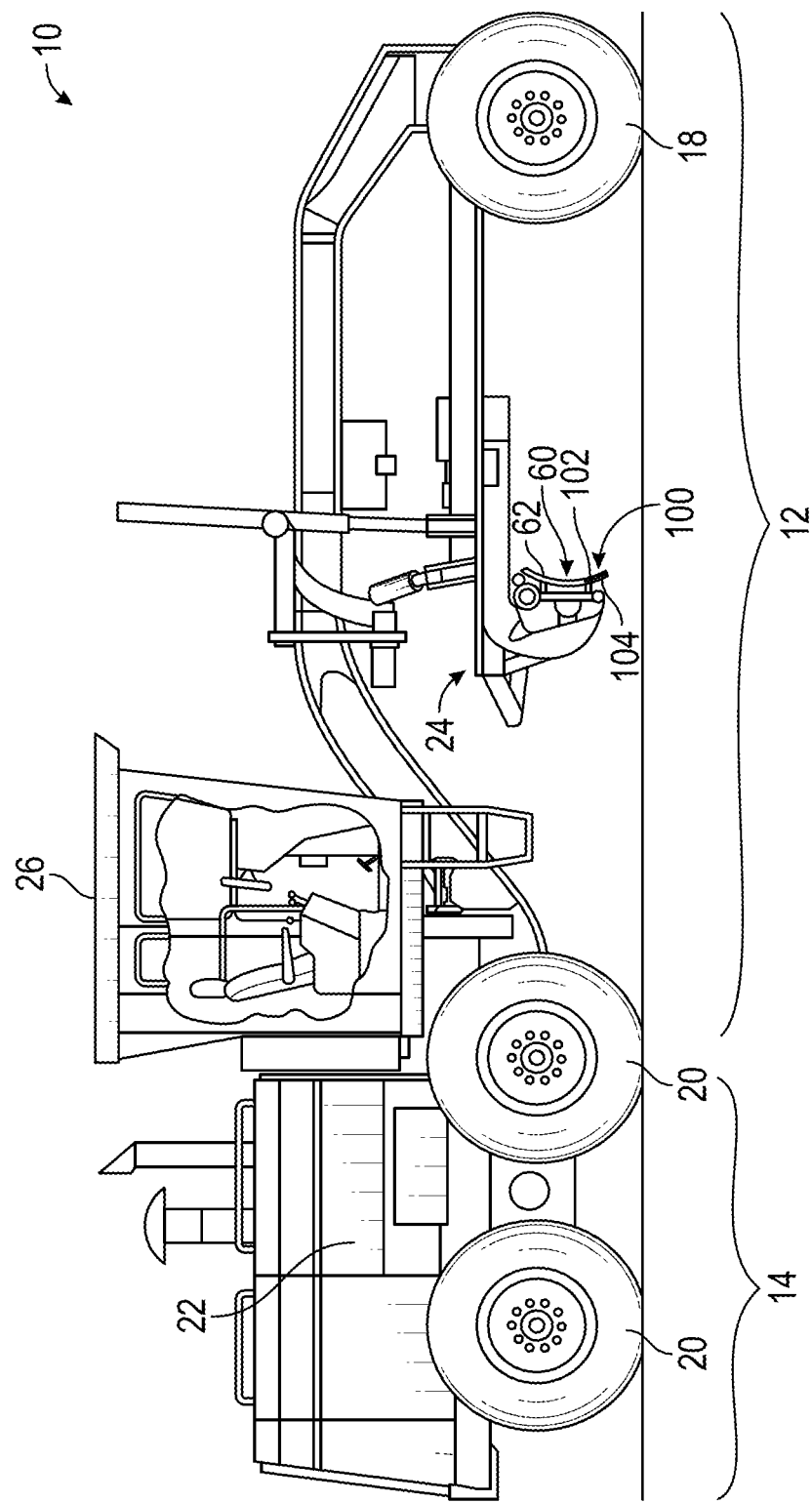
FIG. 1 is an illustration of an exemplary motor grader.

FIG. 1 is an illustration of an exemplary motor grader. The machine 10, also referred to as a ground engaging machine, discussed in this disclosure is generally depicted and referred to as a motor grader. However, it should be readily understood by those having ordinary skill in the art that the systems of the present disclosure can be used on other machines such as wheel dozers, track-type loaders, skid steer loaders, multi-terrain loaders, compact track loaders, track loaders, wheel loaders, wheel-tractor scrapers, as well as other machines. As should also be understood, such machines may be used in materials handling, construction, and other industries.

The motor grader 10 includes a front frame portion 12, a rear frame portion 14, and a moldboard 60 provided in the front frame portion 12. The front and rear frame portions 12, 14 are supported by front and rear wheels 18, 20. The front and rear wheels 18, 20 work independently of one another. The moldboard 60 is used to move earth or other materials to provide a grading surface. A power source, such as an engine 22, is provided to generate power to propel the motor grader 10. The engine 22 may be mounted on the rear frame portion 14.

In this exemplary embodiment, the motor grader 10 may include a linkage assembly 24 that allows the moldboard 60 to be moved to various positions relative to the motor grader 10. The blade may be placed in a fixed position or variable positions during earth moving operations.

The moldboard 60 has a cutting edge 100 extending along its lower forward surface, for moving working materials such as soil, rock, sand, garbage, brush, and any other movable material.

Machine 10 further includes an operator station 26. The operator station 26 is configured to hold an operator of the machine 10, and includes control devices configured to allow the operator to control operations of the machine 10 from the operator station 26. The operator station 26 may be open or may be enclosed within a cab, as desired.

The moldboard 60 can be configured to mount to machine 10. The moldboard 60 can be configured to engage, dig, or otherwise receive material, such as soil, rock, gravel, and/or other materials (not shown) to be moved by machine 10. The moldboard 60 is formed of a rigid material, such as steel, iron, or other material and has a front side 62. Thus, the front side 62 receives and moves material when lowered to a position to engage the material and when machine 10 is traveling generally in a forward direction. To efficiently move the material, the moldboard 60 can be generally formed having an arcuate profile shape. Such arc or radius shape allows the moldboard 60 to engage, push, and roll the material as the material moves up the moldboard 60 and tumbles forward while machine 10 moves in the forward direction. However, it is contemplated that the profile shape of the moldboard 60 may be other shapes.

The cutting edge 100 can include a front side 102 and a back side 104 opposite the front side 102.

Figure 2:
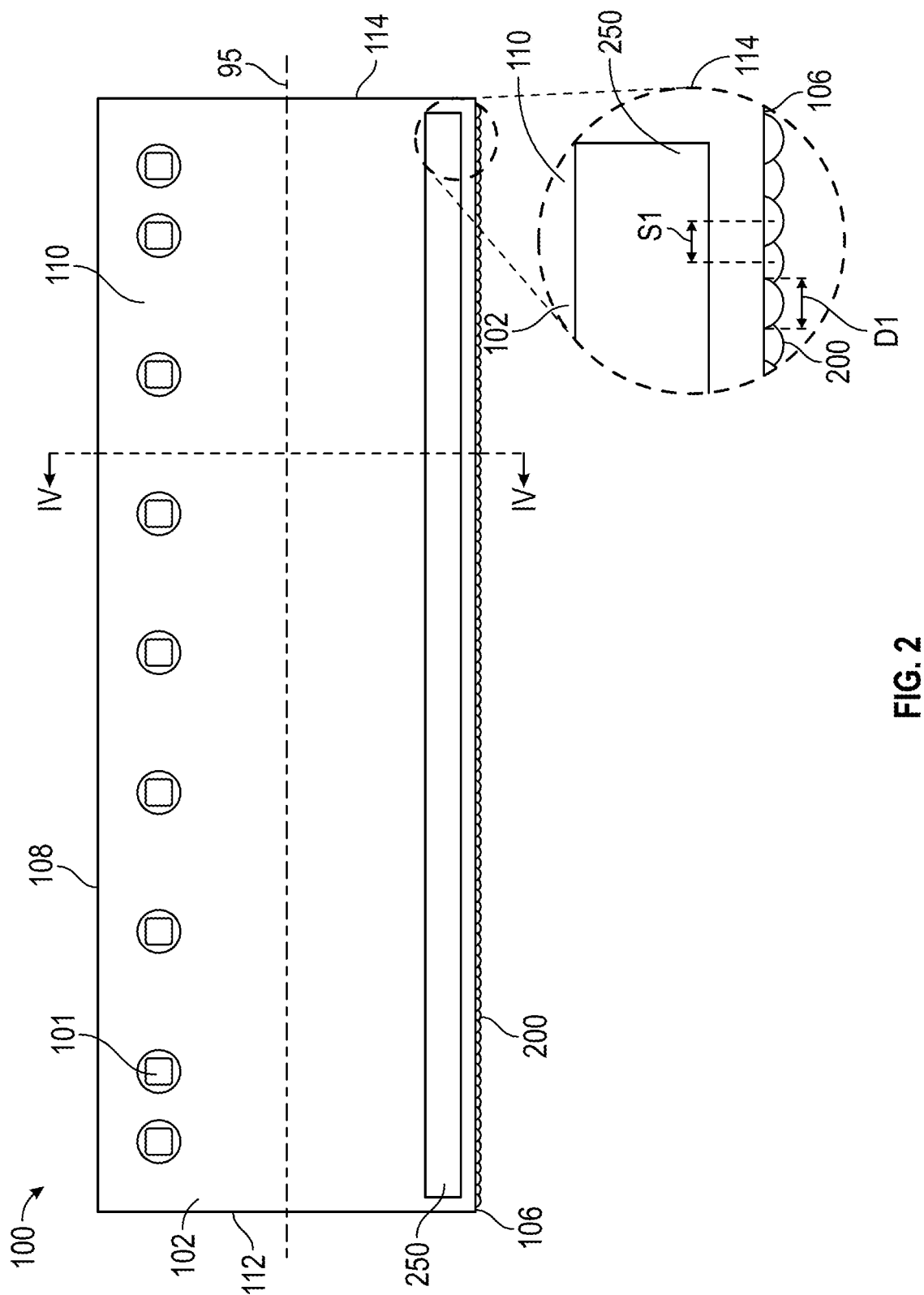
FIG. 2 is an elevation view of the cutting edge shown in FIG. 1, and an enlarged portion of the bottom right corner of the cutting edge.

FIG. 2 is an elevation view of the cutting edge 100 shown in FIG. 1. The cutting edge 100 can include a bottom side 106 and a top side 108 opposite the bottom side 106. The bottom side 106 can extend from the front side 102 to the back side 104 (shown on FIG. 1). The top side 108 can extend from the front side 102 to the back side 104, opposite from the bottom side 106. When the cutting edge 100 is mounted to the machine 10, the front side 102 and bottom side 106 can form a leading edge for engaging working material, such as the ground. The top side 108 and the back side 104 can be positioned adjacent to the front side 62 of the moldboard 60 (shown on FIG. 1).

The cutting edge 100 can have a cutting edge body 110 that makes up the majority of the cutting edge 100. The cutting edge 100 can extend along a longitudinal axis 95. The cutting edge 100 can include mounting holes 101. In an embodiment the mounting holes 101 can extend through the front side 102 and through the back side 104 (shown in FIG. 1) of the cutting edge 100. Mounting holes 101 can be shaped with a circular depression extending into the front side 102 but not through the back side 104. The mounting holes 101 can form a rectangular shaped hole through the cutting edge 100. The mounting holes 101 can be shaped to receive fasteners (not shown) to mount the cutting edge 100 to the moldboard 60. In an embodiment the mounting holes 101 are located proximate to the top side 108. In other examples the mounting holes 101 are located proximate to the middle of the cutting edge or the bottom side 106.

The cutting edge 100 can include a first side 112 and a second side 114 opposite from the first side 112. The first side 112 can extend from the front side 102 to the back side 104 and from the bottom side 106 to the top side 108. The second side 114 can extend from the front side 102 to the back side 104 and from the bottom side 106 to the top side 108, opposite from the first side 112.

The cutting edge 100 can include an abrasion resistant area 250 and a plurality of inserts 200. The abrasion resistant area 250 can be located along the front side 102 and be adjacent to the bottom side 106. The abrasion resistant area 250 can extend from adjacent the first side 112 to adjacent the second side 114.

The inserts 200 can be located along the bottom side 106. The inserts 200 can protrude away from the bottom side 106 and the protruding portion can have a dome like shape. The inserts 200 can be arranged in two or more rows (more clearly seen on FIG. 3) and can overlap one another to create a continuous arrangement of inserts 200. In other words, an on-center spacing S1 of the inserts 200, in the longitudinal direction of the cutting edge 100, can be less than the diameter D1 of one of the inserts 200 and can be more than 25% of the diameter D1. In an embodiment the diameter D1 of each insert 200 can be substantially similar. In other examples the inserts 200 can have varying sizes and diameters D1. In examples the diameter D1 of the inserts can be 5 mm to 50 mm.

Figure 3:
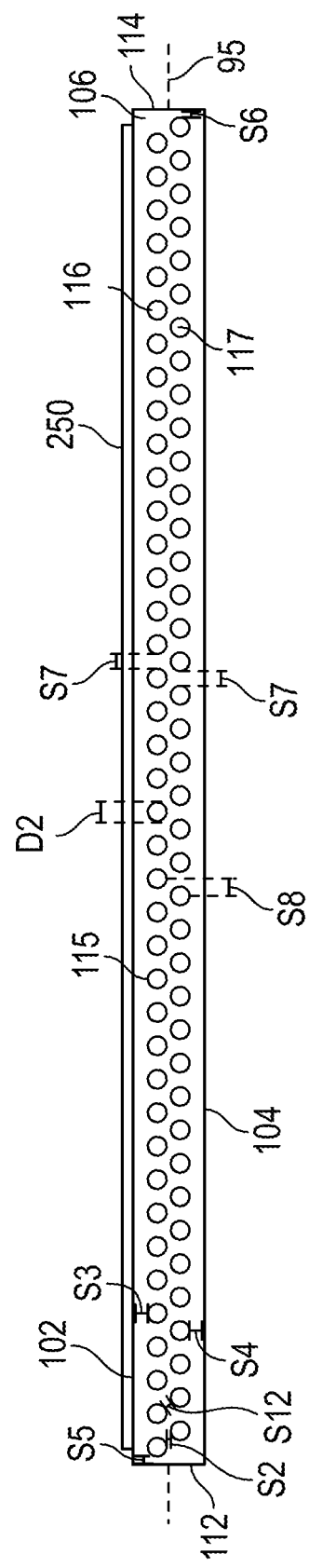
FIG. 3 is a bottom view of the cutting edge from FIG. 2 with the inserts removed.

FIG. 3 is a bottom view of the cutting edge from FIG. 2 with the inserts removed. The cutting edge 100 can include a plurality of insert apertures 115 located along the bottom side 106. The insert apertures 115 can extend from the bottom side 106 towards the top side 108. In the embodiments shown in FIGS. 2-4, the insert apertures 115 and inserts 200 have substantially similar arrangements. Therefor the descriptions directed at the insert apertures 115 and inserts 200 are intended to be interchangeable.

The insert apertures can each have a diameter D2. In an embodiment, the diameter D2 is substantially similar to the diameter D1 of the inserts 200. In examples, the diameter D2 is slightly smaller or larger than the diameter D1 and can be sized to receive the inserts 200 via interference fit. In an embodiment the diameter D2 of each insert aperture 115 can be substantially similar. In other examples the insert apertures 115 can have varying sizes and diameters D2.

The plurality of insert apertures 115 can be arranged into two rows. In an embodiment there is a first row of insert apertures 116 and there is a second row of insert apertures 117. In other examples there are three, four, five, six, or more rows. The first row 116 and the second row 117 can extend from adjacent the first side 112 to adjacent the second side 114. The second row of insert apertures 117 can be arranged between the first row of insert apertures 116. In other words, the arrangement of the insert apertures 115 alternates between the first row 116 and the second row 117 starting from proximate the first side 112 and extending to proximate the second side 114.

The first row of insert apertures 116 and the second row of insert apertures 117 can be separated by a spacing S2. The spacing S2 can be the distance between a tangent line to all of the first row insert apertures 116 that is adjacent to and parallel with the longitudinal axis 95 and a second tangent line to all of the second row insert apertures 117 that is adjacent to and parallel with the longitudinal axis 95. The spacing S2 between the first row of insert apertures 116 and the second row of insert apertures 117 can be less than the diameter D2 of one of the insert apertures 115. In an embodiment the spacing S2 between the first row of insert apertures 116 and the second row of insert apertures 117 can be less than 50% of the diameter D2 of one of the insert apertures 115. In an embodiment the spacing S2 between the first row of insert apertures 116 and the second row of insert apertures 117 can be more than 25% of the diameter D2 of one of the insert apertures 115.

In an embodiment the first row of insert apertures 116 can be separated from the front side 102 by a spacing S3. The spacing S3 can be the distance between a tangent line to all of the first row insert apertures 116 that is adjacent to and parallel with the front side 102 and the front side 102. The first row of the insert apertures 116 can be spaced S3 from the front side 102 less than the diameter D2 of one of the plurality of insert apertures 115. In an embodiment the first row of the insert apertures 116 can be spaced S3 from the front side 102 more than 50% (half) of the diameter D2 of one of the plurality of insert apertures 115.

In an embodiment the second row of insert apertures 117 can be separated from the back side 104 by a spacing S4. The spacing S4 can be the distance between a tangent line to all of the second row insert apertures 117 that is adjacent to and parallel with the back side 104. The second row of insert apertures 117 can be spaced S4 from the back side 104 less than the diameter D2 of one of the plurality of insert apertures 115. In an embodiment the second row of insert apertures 117 can be spaced S4 from the back side 104 more than 50% (half) of the diameter D2 of one of the plurality of insert apertures 115.

In an embodiment one of the insert apertures 115 can be spaced S5 from the first side 112 less than the diameter D2 of one of the plurality of insert apertures 115. In an embodiment one of the insert apertures 115 can be spaced S5 from the first side 112 more than 25% of the diameter D2 of one of the plurality of insert apertures 115.

In an embodiment one of the insert apertures 115 can be spaced S6 from the second side 114 less than the diameter D2 of one of the plurality of insert apertures 115. In an embodiment one of the insert apertures 115 can be spaced S6 from the second side 114 more than 25% of the diameter D2 of one of the plurality of insert apertures 115.

In an embodiment, first row of insert apertures 116 are separated from adjacent first row insert apertures 116 by a spacing of S7. The spacing S7 can be the distance between a tangent line to an insert aperture of the first row 116 that is perpendicular to the longitudinal axis 95 and a second tangent line to an adjacent insert aperture of the first row 116 that is perpendicular to the longitudinal axis 95. The first row of insert apertures 116 can be spaced S7 from adjacent plurality of insert apertures within the first row 116 less than the diameter D2 of one of the plurality of insert apertures 115. The spacing S7 can be larger than 25% of the diameter D2.

In an embodiment the second row of insert apertures 117 can be spaced S7 from adjacent plurality of insert apertures within the second row 117 less than the diameter D2 of one of the plurality of insert apertures 115. The spacing S7 can be larger than 25% of the diameter D2.

In an embodiment, the first row insert apertures 116 and the second row insert apertures 117 can be separated with respect to the longitudinal axis 95 by an on center spacing of S8. The on-center spacing S8, with respect to the longitudinal axis 95 and between the first row of insert apertures 116 and the second row of insert apertures 117 can be less than the diameter D2 of one of the insert apertures 115. In an embodiment the on-center spacing S8 between first row insert apertures 116 and the second row of insert apertures 117 can be substantially similar to the on-center spacing S1 of the inserts 200.

In an embodiment, the first row insert apertures 116 can be separated from adjacent second row insert apertures 117 by a spacing S12. The spacing S12 can be less than the diameter D2 of one of the insert apertures 115.

Figure 4:
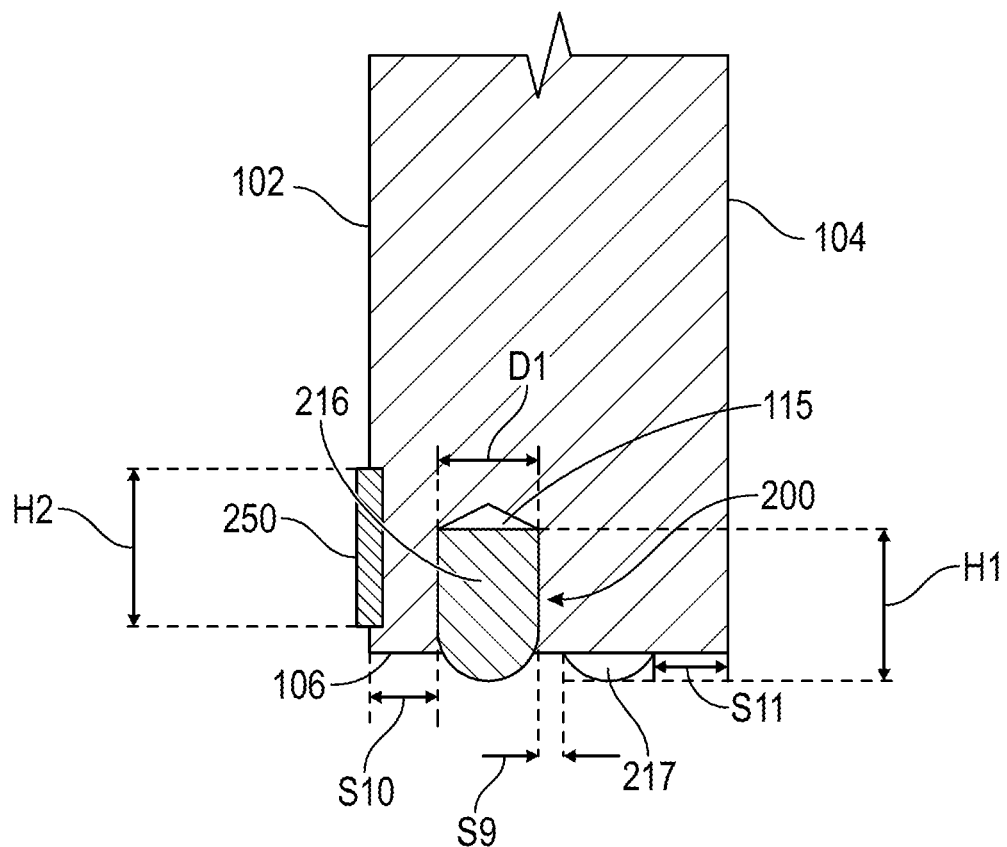
FIG. 4 is a cross-section view of a portion of the cutting edge from FIG. 2 taken along line IV-IV.

FIG. 4 is a cross-section view of the cutting edge from FIG. 2 taken along line IV-IV. In an embodiment the plurality of inserts 200 each can extend beyond the bottom side 206 and have a dome shape protruding from the plurality of insert apertures 115. The plurality of inserts 200 can be arranged into two rows. In an embodiment there is a first row of inserts 216 and there is a second row of inserts 217. In other examples there are three, four, five, six, or more rows.

The spacing S9 between the first row of inserts 216 and the second row of inserts 217 can be less than the diameter D1 of one of the inserts 200. In an embodiment the spacing S2 between the first row of inserts 216 and the second row of inserts 217 can be less than 50% of the diameter D1 of one of the inserts 200. In an embodiment the spacing S9 is substantially similar to the spacing S2. In an embodiment the spacing S9 between the first row of inserts 216 and the second row of inserts 217 can be more than 25% of the diameter D1 of one of the inserts 200.

In an embodiment the first row of inserts 216 can be spaced S10 from the front side 102 less than the diameter D1 of one of the plurality of inserts 200. In an embodiment the first row of inserts 216 can be spaced S10 from the front side 102 more than 50% of the diameter D1 of one of the plurality of inserts 200. In an embodiment the spacing S10 is substantially similar to the spacing S3.

In an embodiment the second row of inserts 217 can be spaced S11 from the back side 104 less than the diameter D1 of one of the plurality of inserts 200. In an embodiment the second row of inserts 217 can be spaced S11 from the back side 104 more than 50% of the diameter D2 of one of the plurality of insert apertures 115. In an embodiment the spacing S11 is substantially similar to the spacing S4.

The inserts 200 can have a height H1 and the abrasion resistant area 250 can have a height H2. The height H2 of the abrasion resistant area 250 can be within the range of 75% to 150% of the height H1 of the inserts 200.

INDUSTRIAL APPLICABILITY

The present disclosure generally applies to a cutting edge 100 for a machine 10. It is understood that the cutting edge 100 may be used with any stationary or mobile machine known in the art. Such machines may be used in construction, farming, mining, power generation, and/or other like applications. Accordingly, such machines may include, for example, excavators, track-type tractors, wheel loaders, on-road vehicles, off-road vehicles, generator sets, motor graders, or other like machines.

To increase the longevity or the usable life of the moldboard 60, the cutting edge 100 can be formed of an alloy of metallic ground engaging materials. The cutting edge 100 can include mounting holes 101 that can align with mounting holes in the moldboard 60 (not shown). The mounting holes of the moldboard 60 can be proximate the ground engaging or lower edge of the moldboard. The mounting holes 101 of the cutting edge 100 and the mounting holes of the moldboard 60 can receive fasteners (not shown) to mount the cutting edge 100 to the moldboard 60.

Conventional cutting edges and components such as the cutting edge body 110 can be made of rolled section steel from a single material, which can be quenched and tempered to a hardness level that balances toughness and wear resistance. A lower hardness level is required to improve toughness, which results in reduction in wear resistance of a cutting edge.

The cutting edge 100 can utilize inserts 200 that are made of materials that are harder than cutting edge body 110 to improve wear resistance and longevity. The inserts 200 can comprise ceramic materials such as carbide and other hard materials such as diamond.

The inserts 200 can be arranged and spaced to provide for a sufficient quantity of hardened material to improve wear performance while also providing sufficient clear spacing S3, S4, S5, S6 from sides 102, 104, 112, 114, corners, and adjacent inserts 200 to mitigate premature failure such as fracturing of the cutting edge body 110. For example, clear spacing S3, S4 more than half of the diameter D2 of the insert apertures 115.

The inserts 200 can be arranged in two rows 216, 217 and the first row inserts 216 can overlap (i.e. spacing S1 is less than diameter D1) with the second row inserts 217 and can provide a smoother finished surface than insert arrangements that do not overlap. The spacing between the insert rows S9 can be less than one diameter D1 and can promote a more even wear distribution, for example wearing into a flat surface.

The inserts 200 can be press-fit/interference fit into the insert apertures 115 and may reduce manufacturing cost and labor time to assemble the cutting edge 100. In other examples the inserts 200 can be affixed to the insert apertures 115 by other methods, for example by brazing and screwing.

The cutting edge 100 can further include an abrasion resistant area 250 that is harder than the cutting edge body 110. The abrasion resistant area 250 can help mitigate the wear on the leading edge of the cutting edge 100 and reduce the rate of wear of the cutting edge body 110 between the inserts 200 and the abrasion resistant area 250. The abrasion resistant area 250 can be formed along the front side 102 adjacent to the bottom side 106 by welding with a filler material that is harder than the material of the cutting edge body.

Although this disclosure has been shown and described with respect to detailed embodiments thereof, it will be understood by those skilled in the art that various changes in form and detail thereof may be made without departing from the spirit and scope of the claimed disclosure. Accordingly, the preceding detailed description is merely exemplary in nature and is not intended to limit the disclosure or the application and uses of the disclosure. In particular, the described embodiments are not limited to use in conjunction with a particular type of machine 10. For example, the described embodiments may be applied to machines employed in mining, construction, farming, and power generation applications, or any variant thereof. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A cutting edge for a ground engaging machine, the cutting edge comprising:
    a top side;
    a bottom side opposite the top side;
    a front side extending between the top side and bottom side;
    a back side opposite the front side, the back side extending between the top side and the bottom side;
    a first side extending between the top side and the bottom side and extending between the front side and the back side;
    a second side opposite the first side, the second side extending between the top side and the bottom side and extending between the front side and the back side; and
    a plurality of insert apertures along the bottom side, each of the plurality of insert apertures having a diameter, the plurality of insert apertures arranged as at least a first row and a second row, each row including a plurality of the plurality of insert apertures and extending from adjacent the first side to adjacent the second side, the first row of the plurality of insert apertures spaced less than the diameter of one of the plurality of insert apertures from the second row of the plurality of insert apertures, the plurality of insert apertures spaced from the front side, the back side, the first side, and the second side.

2. The cutting edge of claim 1, further comprising a plurality of inserts located within the plurality of insert apertures, the plurality of inserts protruding beyond the bottom side.

3. The cutting edge of claim 2, wherein the plurality of inserts are made of at least one of ceramic and diamond.

4. The cutting edge of claim 2, wherein the plurality of inserts are adjoined to the plurality of insert apertures by interference fit.

5. The cutting edge of claim 1, wherein each of the plurality of insert apertures within the first row are spaced from adjacent insert apertures within the first row by less than the diameter of one of the plurality of insert apertures.

6. The cutting edge of claim 2, wherein the plurality of inserts each have a dome shape protruding from the plurality of insert apertures.

7. The cutting edge of claim 4, wherein each of the plurality of insert apertures are spaced less than the diameter of one of the plurality of insert apertures from at least one of the front side, back side, first side, and second side.

8. A cutting edge for a ground engaging machine, the cutting edge comprising:
    a top side;
    a bottom side opposite the top side;
    a front side extending between the top side and the bottom side;
    a back side opposite the front side, the back side extending between the top side and the bottom side;
    a first side extending between the top side and the bottom side and extending between the front side and the back side;
    a second side opposite the first side, the second side extending between the top side and the bottom side and extending between the front side and the back side; and
    a plurality of insert apertures along the bottom side, each of the plurality of insert apertures having a diameter, the plurality of insert apertures arranged as at least two rows, each row including a plurality of the plurality of insert apertures and extending from adjacent the first side to adjacent the second side, the plurality of insert apertures spaced more than half the diameter of one of the plurality of insert apertures from the front side and the back side.

9. The cutting edge of claim 8, further comprising a plurality of inserts located within the plurality of insert apertures, the plurality of inserts protruding beyond the bottom side.

10. The cutting edge of claim 9, wherein the plurality of inserts are made of at least one of ceramic and diamond.

11. The cutting edge of claim 9, wherein the plurality of inserts are adjoined to the plurality of insert apertures by interference fit.

12. The cutting edge of claim 8, wherein each of the plurality of insert apertures within the first row are spaced from adjacent insert apertures within the first row by less than the diameter of the plurality of insert apertures.

13. A cutting edge for a ground engaging machine with a moldboard, the cutting edge comprising:
    a top side;
    a bottom side opposite the top side;
    a front side extending between the top side and the bottom side;
    a back side opposite the front side, the back side extending between the top side and the bottom side;
    a first side extending between the top side and the bottom side and extending between the front side and the back side;

a second side opposite the first side, the second side extending between the top side and the bottom side and extending between the front side and the back side; and mounting holes positioned proximate to the top side and shaped to receive fasteners to mount the cutting edge to the moldboard; and a plurality of insert apertures along the bottom side, each of the plurality of insert apertures having a diameter, the plurality of insert apertures arranged as at least a first row and a second row extending from adjacent the first side to adjacent the second side, the first row of the plurality of insert apertures spaced less than the diameter of one of the plurality of insert apertures from adjacent plurality of insert apertures within the first row.

14. The cutting edge of claim 13, further comprising an abrasion resistant area located along the front side and adjacent to the bottom side, the abrasion resistant area extending from adjacent the first side to adjacent the second side.

15. The cutting edge of claim 14, further comprising a plurality of inserts located within the plurality of insert apertures, the plurality of inserts protruding beyond the bottom side.

16. The cutting edge of claim 15, wherein the abrasion resistant area has a height that is between 75% and 150% the height of the plurality of inserts.

17. The cutting edge of claim 15, wherein the plurality of inserts are made of at least one of ceramic and diamond.

18. The cutting edge of claim 15, wherein plurality of inserts are adjoined to the plurality of insert apertures by interference fit.

* * * * *